United States Patent [19]

Alfille

[11] Patent Number: 4,502,760

[45] Date of Patent: Mar. 5, 1985

[54] ACCESSORY HOLDER MODULE FOR OPTICAL EQUIPMENT

[76] Inventor: Jules Alfille, 13 Residence des Mourinoux, Avenue de la Redoute, 92600 Asnieres, France

[21] Appl. No.: 471,251

[22] Filed: Mar. 2, 1983

[30] Foreign Application Priority Data

Mar. 29, 1982 [FR] France .................................. 82 05301

[51] Int. Cl.³ .............................................. G02B 7/00
[52] U.S. Cl. ........................................ 350/318; 350/580
[58] Field of Search ................... 350/318, 316, 580

[56] References Cited

U.S. PATENT DOCUMENTS

| 1,151,245 | 8/1915 | Clarke | 350/318 |
|---|---|---|---|
| 2,794,360 | 6/1957 | Eagle | 350/318 |
| 2,953,970 | 9/1960 | Maynard | 350/318 |
| 4,302,078 | 11/1981 | Stravitz | 350/318 |
| 4,390,242 | 6/1983 | Tatsumi | 350/318 |
| 4,443,061 | 4/1984 | Coquin | 350/318 |

FOREIGN PATENT DOCUMENTS

| 936788 | 11/1955 | Fed. Rep. of Germany | 350/318 |
|---|---|---|---|
| 936790 | 12/1955 | Fed. Rep. of Germany | 350/318 |
| 258866 | 6/1949 | Switzerland | 350/580 |

*Primary Examiner*—Jon W. Henry
*Attorney, Agent, or Firm*—McAulay, Fields, Fisher, Goldstein & Nissen

[57] ABSTRACT

The module comprises first and second plates (4,5), with means (6) for holding said plates substantially parallel to each other and face-to-face to leave an accessory-receiving space (16) therebetween. The plates have respective optical path openings (7,8) through them substantially aligned along a common optical axis (9). Complementary male and female snap-fitting means (10, 11) are fitted to the outside surfaces of the first and second plates respectively so that a plurality of holders can be stacked to one another along the optical axis. Each holder has internal gripping means (32, 33) for resiliently gripping an accessory (12, 13) in the longitudinal direction. Robust holder modules can be cheaply manufactured from plastic to provide great versatility in fitting accessories such as filters and/or masks, polarizers, etc. . . . to a camera or other optical equipment.

10 Claims, 2 Drawing Figures

ACCESSORY HOLDER MODULE FOR OPTICAL EQUIPMENT

The present invention relates to a modular assembly for holding various accessories to the objective lens of optical equipment such as cameras for taking still or motion pictures, or projectors therefor. The accessory holder is applicable both to consumer equipment and to professional equipment. Thus it may be used with optical scientific apparatus, with astronomical telescopes, with TV cameras, and in general with any apparatus capable of storing or reproducing an image.

The holder serves to place one or more accessories, e.g. optical filters of various kinds, in front of the objective lens of the optical equipment with which it is used. Uses can vary from meeting special observation requirements for astronomy to adding a "personal" touch to the work of a photographer.

To keep down manufacturing costs, and hence prices paid by customers, while at the same time meeting the requirements of as many different end users as possible, it is necessary for an accessory holder to be modular and for it to be quick and easy to assemble and fit onto as wide a range of optical equipment as possible. Further, the wider the range of equipment on which it can be fitted, the better the opportunities for mass production and low end prices.

Preferred embodiments of the present invention provide an accessory holder module suitable for building up a series of optical accessories which are held side-by-side at right angles to the optical axis of the equipment to which they are fitted. Since the individual accessory holders are modular, and since each holds at least one accessory, all sorts of accessory combinations can readily be built up, ready for fitting as a whole to an objective lens in order to process light rays passing therethrough, e.g. before reaching the dark chamber inside a camera.

SUMMARY OF THE INVENTION

More particularly, the present invention provides an accessory holder module for optical equipment, the module comprising first and second plates, means for holding said plates substantially parallel to each other and face-to-face to leave an accessory-receiving space therebetween, each plate having an opening therethrough, said openings being substantially aligned along a common optical axis, complementary male and female snap-fitting means being fitted to the outside surfaces of said first and second plates respectively, and gripping means for resiliently gripping an accessory in the longitudinal direction when an accessory is inserted into said accessory-receiving space.

BRIEF DESCRIPTION OF THE DRAWINGS

An embodiment of the invention is described by way of example with reference to the accompanying drawings, in which.

MORE DETAILED DESCRIPTION

Figure 1:
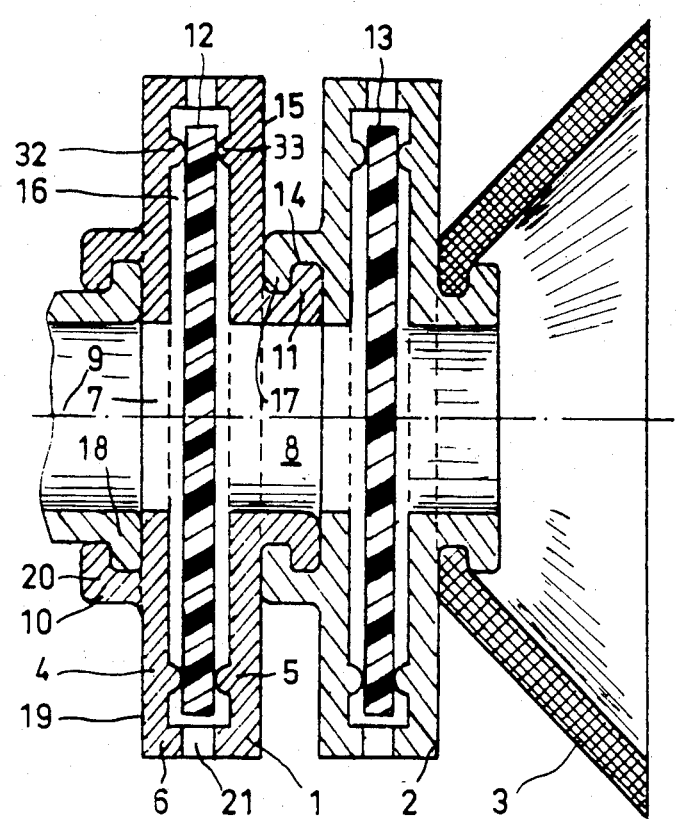
FIG. 1 is a section through a set of two accessory holder modules in accordance with the invention.

With reference to FIG. 1, two identical modular accessory holders 1 and 2 are assembled together and are mounted on a camera lens. The assembly is fitted with a compatible sunshade 3. Each holder comprises a pair of substantially plane plates 4 and 5 which are held parallel and a small distance apart by distance pieces 6, leaving an accessory-receiving space 16 in between the plates. The plates and the distance pieces are preferably made as a single moulding of thermoplastic material.

Substantially in the middle of each of the plates 4 and 5 there are openings 7 and 8 respectively. These openings are aligned on a common axis 9 which is aligned, in use, with the optical axis of the equipment to which the holders are fitted. The openings 7 and 8 are preferably circular.

Further, each plate includes outwardly-directed snap fitting means disposed around its opening. The plate 4 has a female snap fitting 10 and the plate 5 has a male snap-fitting 11. The snap fittings 10 and 11 are complementary so that the male fitting on one holder can be snapped in conventional manner into engagement with the female fitting on another holder. Such an arrangement enables a plurality of holders to be readily assembled in series, and FIG. 1 shows an assembly of two such holders. Each holder would then be used to hold a different accessory, eg. a color filter, a polarising filter, a mask or a stop, etc . . . , with two such accessories being shown diagrammatically at 12 and 13. The accessories are lodged inside the holders, in the space 16 between the plates 4 and 5.

Advantageously, each male snap-fitting 11 comprises a tubular portion with an outwardly directed flange 14 at its end, leaving a circular groove 17 of width e between the flange 14 and the outside surface 15 of the plate 5.

The complementary female snap-fitting 10 then comprises a tubular portion of greater diameter with an inwardly directed flange 20 at its end, leaving a circular groove 18, likewise of width e, between the flange 20 and the outside face 19 of the plate 4. The flanges 14 and 20 are also substantially of width e, and it can be seen that the flange on each type of fitting is readily received in the groove of the opposite type of fitting.

Advantageously, the snap-fittings are circular and centred on the optical axis 9 so that the holders can rotate about said axis, either individually or as an assembly. The fittings may describe a complete circle, thereby enabling 360° rotation, or they may be in the form of sectors enabling partial rotation. Another arrangement would be for one of the fittings, say the male fitting 11 to describe a complete circle, while the other fitting, in this case the female fitting 10, is in the form of a plurality separate sectors. This would facilitate snap fitting if two complete circles are too stiff when made from some selected materials.

As mentioned above, the two plates 4 and 5 are held a certain distance apart to define an accessory-receiving space 16 in between them. Generally speaking, accessories such as color filters, polarisers, masks, etc . . . are in the form of flat planar members which are inserted into the space 16 via side openings 30 or 31 (see FIG. 2).

The accessories are held in place by being gripped resiliently between longitudinally acting gripping means situated inside the space 16. These means should be at least as long as the maximum distance across the openings 7 and 8 (usually the diameter, as shown). The gripping means may comprise ribs 32 and 33 or 37 and 38 facing each other in pairs and projecting inwardly from respective ones of the plates 4 and 5. The free space between the ribs should be slightly less than the thickness of the expected accessories. So long as the plates 4 and 5 are made of resilient material, the simple fact of pushing an accessory between the pairs of ribs will provide sufficient grip to retain the accessory in place.

Further, it is possible for the distance pieces 6 to have slots 21 running through them, thereby enabling a plurality of accessories to be assembled inside a single holder. Thus in FIG. 2, there is one elongate slide 35 passing through both of the slots 21 side-by-side with a composite elongate slide made up from two half-length slides 34 and 36. These three slides meet on the optical axis. They are given lateral support by two further slide-shaped members 22 and 23 which are held between the gripping means 32, 33, 37 and 38. This sort of composite arrangement is used by some photographers to obtain special effects, for example having different portions of the image in different colors.

Figure 2:
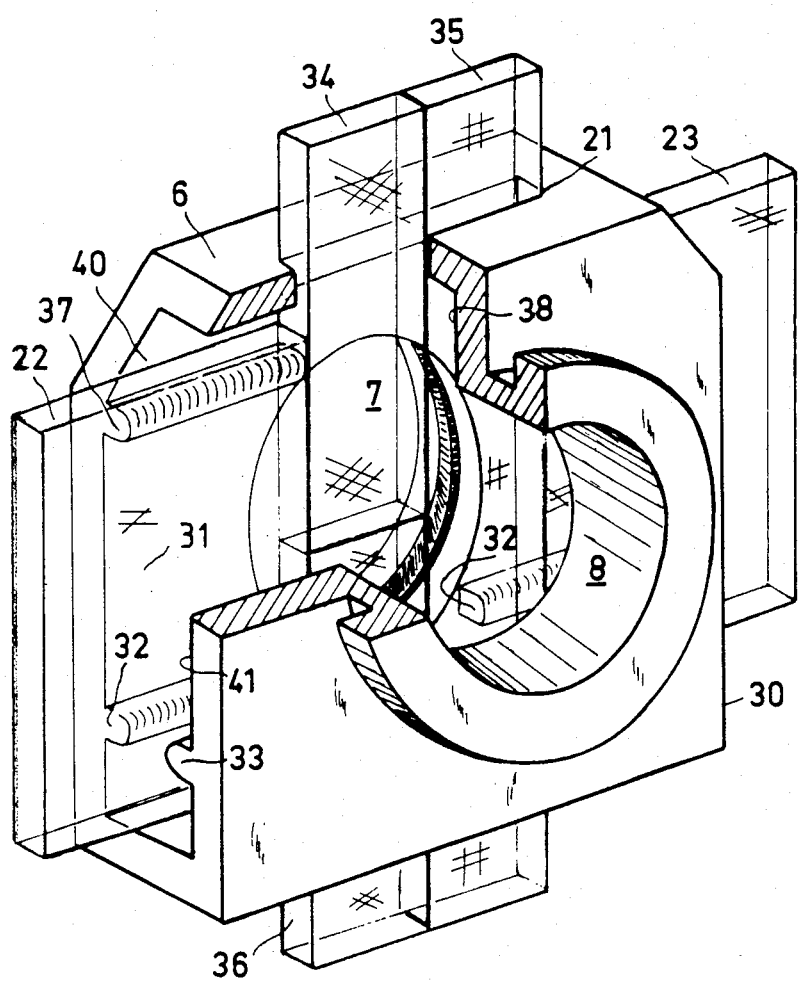
FIG. 2 is a partially cut away perspective view of a single modular accessory holder in accordance with the invention, showing how an accessory is held therein.

The embodiments of the invention described with reference to FIGS. 1 and 2 are not exhaustive of the manner in which the invention may be performed. Many other types of male/female snap-fitting could be used; the essential functional requirements being merely that an assembly of holders on optical equipment is sufficiently rigid for optical use, while being sufficiently resilient for assembly and disassembly. Many plastics can be moulded to meet such requirements; otherwise composite holders could be designed using specifically resilient members such as springs in conjunction with rigid members.

Naturally there must be means for fitting a holder onto the optical equipment with which it is to be used. Generally such means comprise an adapter having one side shaped to match the particular objective lens to which the accessory holder is to be mounted, and its other side shaped to mate with a male or a female snap-fitting on an accessory holder. FIG. 1 shows the holder end of an adapter with a male type of snap-fitting. In some cases, adequate connection may be obtained, at least temporarily, without using any special adapter.

It is also possible for the accessory held by the holder to be mechanical means enabling the two plates to move relative to one another. In such a case, the distance pieces 6 are clearly not made fast to both plates. The accessory may, for example, serve to move one of the plates in parallel past the other so that the optical axes of the two openings are not permanently aligned, this gives an effect similar to moving a mask across the axis. It would also be possible to rotate one plate relative to the other about the optical axis, but in practice it is simpler to rotate one entire accessory holder relative to another.

I claim:

1. An accessory holder module for optical equipment, the module comprising first and second plates, means for holding said plates substantially parallel to each other and face-to-face to leave an accessory-receiving space therebetween, each plate having an opening therethrough, said openings being substantially aligned along a common optical axis, complementary male and female snap-fitting means being fitted to the outside surfaces of said first and second plates respectively, and resilient gripping means integral with said plates and projecting into said space for resiliently gripping the lateral surface of an accessory when an accessory is inserted into said accessory-receiving space.

2. A module according to claim 1, wherein said male snap-fitting means comprise a member projecting axially from said first plate and having an outwardly directed flange around its rim.

3. A module according to claim 2, wherein said female snap-fitting means includes a flange-receiving groove.

4. A module according to claim 3, wherein said groove is complementary in shape to said flange.

5. A module according to claim 4, wherein said complementary snap-fittings present circular symmetry about said optical axis.

6. A module according to claim 5, wherein at least one of said snap-fittings extends over a full 360°.

7. A module according to claim 1, wherein said gripping means comprise at least one pair of ribs projecting inwardly from said first and second plates and facing each other, the free space between said ribs being less than the thickness of an accessory and the plates being sufficiently resilient to provide said resilient gripping when an accessory is inserted between said ribs.

8. A module according to claim 7, wherein said ribs are at least as long as the maximum distance across said openings.

9. A module according to claim 7, including two pairs of facing ribs, disposed symmetrically to each other relative to the optical axis.

10. A module according to claim 1, wherein said means for holding the plates apart include at least one slot for accessory insertion, said slot being in the same plane as the plane in which the accessories are gripped in use.

* * * * *